United States Patent [19]
Suga

[11] Patent Number: 6,024,186
[45] Date of Patent: Feb. 15, 2000

[54] AUXILIARY POWER SUPPLY APPARATUS FOR BICYCLES

[76] Inventor: Toshihisa Suga, 13-18, Nakacho 2-Chome, Urawa-shi, Saitama-Ken, Japan

[21] Appl. No.: 08/957,378

[22] Filed: Oct. 24, 1997

[30] Foreign Application Priority Data

Oct. 24, 1996 [JP] Japan ................................ 8-299570

[51] Int. Cl.[7] ................................................ B60K 1/00
[52] U.S. Cl. ................. 180/291; 180/206; 180/65.5; 180/205
[58] Field of Search ................................ 180/291, 206, 180/205, 220, 65.5; 280/214

[56] References Cited

U.S. PATENT DOCUMENTS

| | | | |
|---|---|---|---|
| 2,575,873 | 11/1951 | Henney | 180/65.5 |
| 3,878,910 | 4/1975 | Walker, Jr. | 180/220 |
| 3,912,039 | 10/1975 | Ordemann | 180/33 D |
| 4,200,164 | 4/1980 | Pearne | 180/206 |
| 4,267,898 | 5/1981 | Wheaton | 180/205 |
| 4,280,581 | 7/1981 | Rudwick | 180/207 |
| 5,076,386 | 12/1991 | Ferneding | 180/205 |
| 5,341,892 | 8/1994 | Hirose et al. | 180/220 |
| 5,755,304 | 5/1998 | Trigg et al. | 180/65.5 |
| 5,857,537 | 1/1999 | Matsumoto | 180/206 |

*Primary Examiner*—Paul N. Dickson
*Assistant Examiner*—Lynda Jasmin
*Attorney, Agent, or Firm*—Jacobson, Price, Holman & Stern, PLLC

[57] ABSTRACT

This invention is provided in order to allow an auxiliary power supply apparatus for bicycles to be reliably and rigidly attached to manually-driven bicycles to convert them into practical motor-driven bicycles. An annular activating wheel (9) is attached to spokes (8) of the bicycle driving wheel (7), and the driving device (G) including a driving wheel (12) rotated by a motor (19) and a speed-reducing device is attached to a seat or a chain stay (14,18) using a bolt. The driving wheel is coupled to the annular activating wheel (9).

17 Claims, 13 Drawing Sheets

AUXILIARY POWER SUPPLY APPARATUS FOR BICYCLES

BACKGROUND OF THE INVENTION

1. Field of the Invention

The present invention relates to an apparatus for supplying auxiliary power to reduce a bicyclist's required driving force in a bicycle having at least one steering wheel and a bicycle driving wheel driven by pedals or a similar means.

2. Description of the Prior Art

Motor-driven bicycles that include a battery-powered motor to drive wheels are currently being manufactured. In addition, some commercially available bicycles are equipped with an apparatus for driving wheels in response to a force applied to pedals in order to reduce a bicyclist's driving force.

Such conventional bicycles are initially manufactured for exclusive use in motor-drive configurations. No other commercially available bicycles can be easily converted into practical motor-driven bicycles.

This invention is provided in order to allow the present driving device to be reliably and rigidly attached to various commercially available bicycles in order to convert manually-driven bicycles into practical motor-driven bicycles.

It is an object of this invention to establish conditions required for a driving and transmission device so as to eliminate obstacles to its practical use, thereby enabling the device to be easily attached to a bicycle.

BRIEF SUMMARY OF THE INVENTION

According to this invention, as a means for receiving auxiliary power, an annular activating wheel 9, 9a is concentrically attached to a spoke portion 8 that couples a hub and a rim of a bicycle driving wheel 7, a driving device G, Ga is formed of a motor 19 operative as a source of power and a transmission means for transmitting power to the annular activating wheel 9, 9a, and a bracing member 17 is attached to body constituting members 14, 18 of a bicycle and used to mount the driving device G, Ga.

The bracing member 17 is added to the body of a bicycle to form a rigid frame, to which the driving device G is mounted to ensure the transmission of power. Since the bracing member 17 is installed by connecting together a seat and a chain stay commonly made of pipes, quadrilateral and a small triangle-shaped frames are added to the rear triangle of the body to form a very rigid frame.

According to this invention, as a means for receiving the auxiliary power, the annular activating wheel 9, 9a is attached to the spoke portion 8 of the bicycle driving wheel of the bicycle, and the driving device G, Ga for supplying power to the annular activating wheel 9, 9a is attached to the body portion 14, 18 such as a seat stay or a chain stay. The annular activating wheel and the driving device must be coupled together via a transmission means that satisfies certain installation conditions.

Specifically, the conditions required for the transmission means according to this invention are the ability to maintain the axes of both devices in parallel with each other, to rotate both devices on the same plane while maintaining a constant relationship, and to maintain a constant distance between the rotational axes of both devices.

When the bracing member 17 is fixed to the body portion 14, 18 such as a seat or a chain stay, it may be fixed to a fixture provided on a front attaching member. In addition, when the driving device is bolted on to the attaching member 15, 15a and the bracing member 17, an adjustment nut may be provided on the threaded portion between the bolt holes of both the attaching members 15, 15a and the bracing member 17 so as to arbitrarily change the interval between them.

When the attaching member 15, 15a is fixed to the body portion 14, 18 such as a seat or a chain stay, that surface of the member 15, 15a which has bolt holes through which the driving device G, Ga is bolted, may be disposed on a line perpendicular to the hub axis of the bicycle driving wheel to allow the drive shaft of the driving device to be installed in parallel with the driving wheel.

In the driving device G with the rotatable driving wheel 12, a gear box may be fixed to the motor 19 to support the wheel using a bottom bearing and the front surface of the gear box so that the wheel can be rotated within a motor box.

This invention is assumed to be exclusively used as an auxiliary power supply apparatus for slopes. Thus, since the period of time during which the apparatus is used per travel is short, only a small, lightweight battery with low capacity is required. Such a battery can be charged in about 10 minutes using a quick charger, enabling a bicyclist to charge it immediately before travelling.

When the auxiliary power supply apparatus for bicycles installed in the above manner is activated by operating a drive switch, a force is applied to the driving device G, Ga to rotate the bicycle driving wheel 7. According to this invention, since the driving device G, Ga is fixed not only to the attaching member 15 but also to the bracing member 17, it is prevented from rotating or vibrating.

When the driving device G, Ga is fixed to the attaching member 15 and the bracing member 17, an adjustment nut 30 is used to align the driving device with the annular activating wheel 9, 9a provided on spokes (the spoke portion 8) in order to allow the direction and longitudinal position of the driving wheel 12, 12a to be adjusted easily.

In the driving device with the rotatable driving wheel 12, reaction to the rotation of the motor shaft effected when the motor is activated is used to provide this rotational movement. Once the annular activating wheel with a gear has engaged with the driving wheel 12 with a gear, the resulting driving torque serves to press the gear of the driving wheel 12 in a direction in which it cannot be disengaged. Thus, when the circumferential speed of the bicycle increases and the circumferential speed of the annular activating wheel 9 exceeds the circumferential speed of the driving wheel, the driving wheel is rotationally moved in the direction in which it will be automatically disengaged from the annular activating wheel.

In the driving device with the fixed driving wheel 12a, the annular activating wheel 9a is operatively coupled to the motor shaft 62a only when a drive shaft 41a activates a mechanism, such as a centrifugal clutch, to allow transfer of rotational energy from the motor shaft to the driving wheel. When the drive shaft 41a is stationary, the driving wheel 12a runs idly, so that the driving device is not affected by rotation of the bicycle driving wheel even though the driving wheel 12a remains coupled to the annular activating wheel 9a.

DETAILED DESCRIPTION OF THE PREFERRED EMBODIMENT

Figure 1:
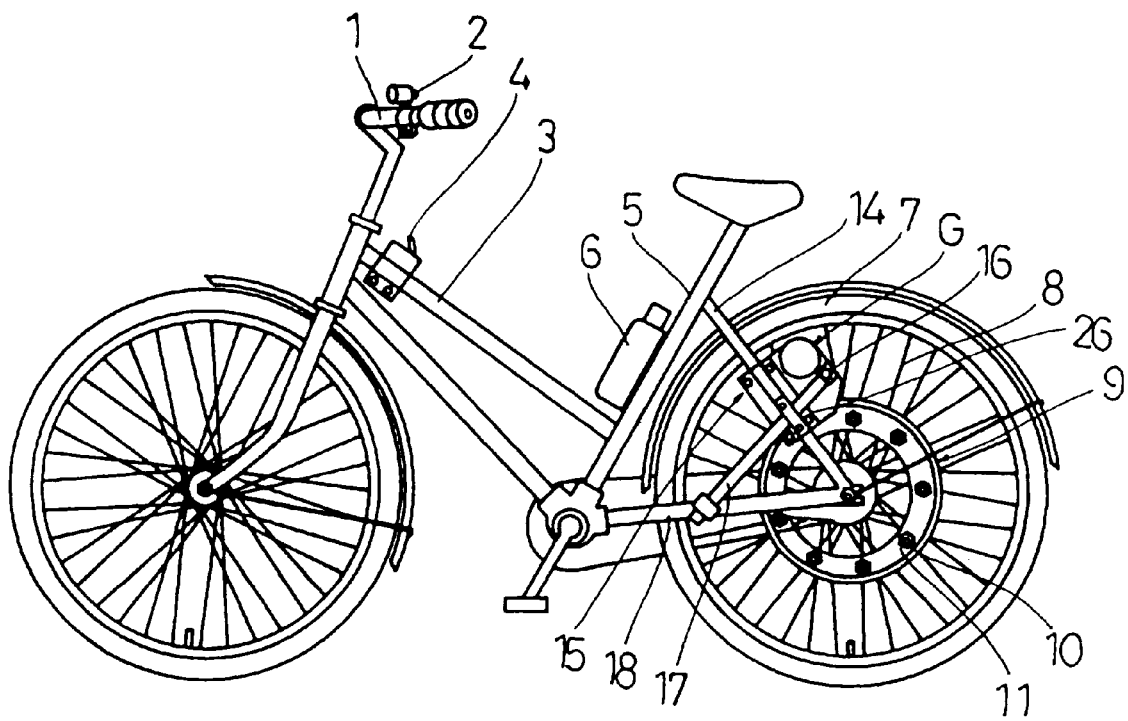
FIG. 1 is a front view showing an example of the installation of an auxiliary power supply apparatus for bicycles according to this invention.

Embodiments of this invention are described with reference to the drawings. FIG. 1 shows the overall bicycle with an auxiliary power supply apparatus according to this invention mounted thereto. Reference G designates a motor-driven driving device. In such a device, for example, a driving switch 2 is mounted on a handle 1, a breaker 4 is mounted on a top tube 3, and a battery 6 is mounted on a seat tube 5.

An annular activating wheel 9 with a gear formed in its circumference is attached to spokes corresponding to a spoke portion 8 of a bicycle driving wheel 7 using, for example, spoke bolts 10 and nuts 11. The driving device G including a driving wheel 12 corresponding to a power transmission means for the annular activating wheel 9 is installed via an attaching member 15 and a bracing member 17 fixed to a seat stay 14. The bracing member 17 is fixed to the seat stay 14 and the chain stay 18.

Figure 2:
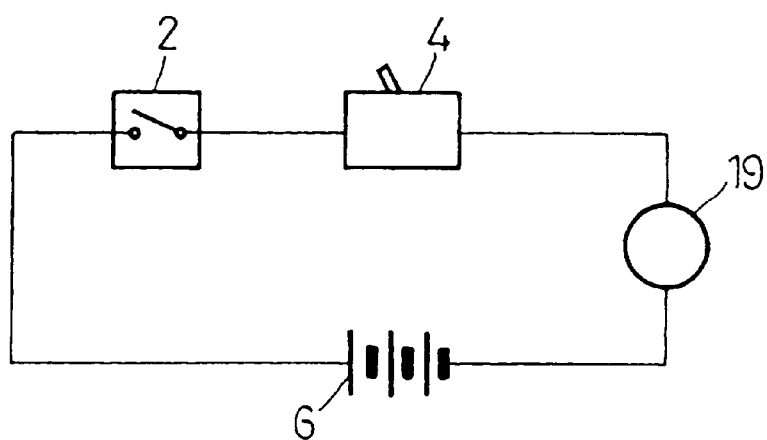
FIG. 2 is a diagram showing a circuit used for FIG. 1.

FIG. 2 shows a circuit diagram for the motor-driven driving device G according to this embodiment. When the driving switch 2 is operated, a current flows from the battery 6 to a motor 19 in the driving device G and the motor 19 is rotated to rotate the driving wheel 12. If excessive current is provided because the motor 19 stops while electricity is being supplied, the breaker 4 is operated to shut off the current.

Figure 3:
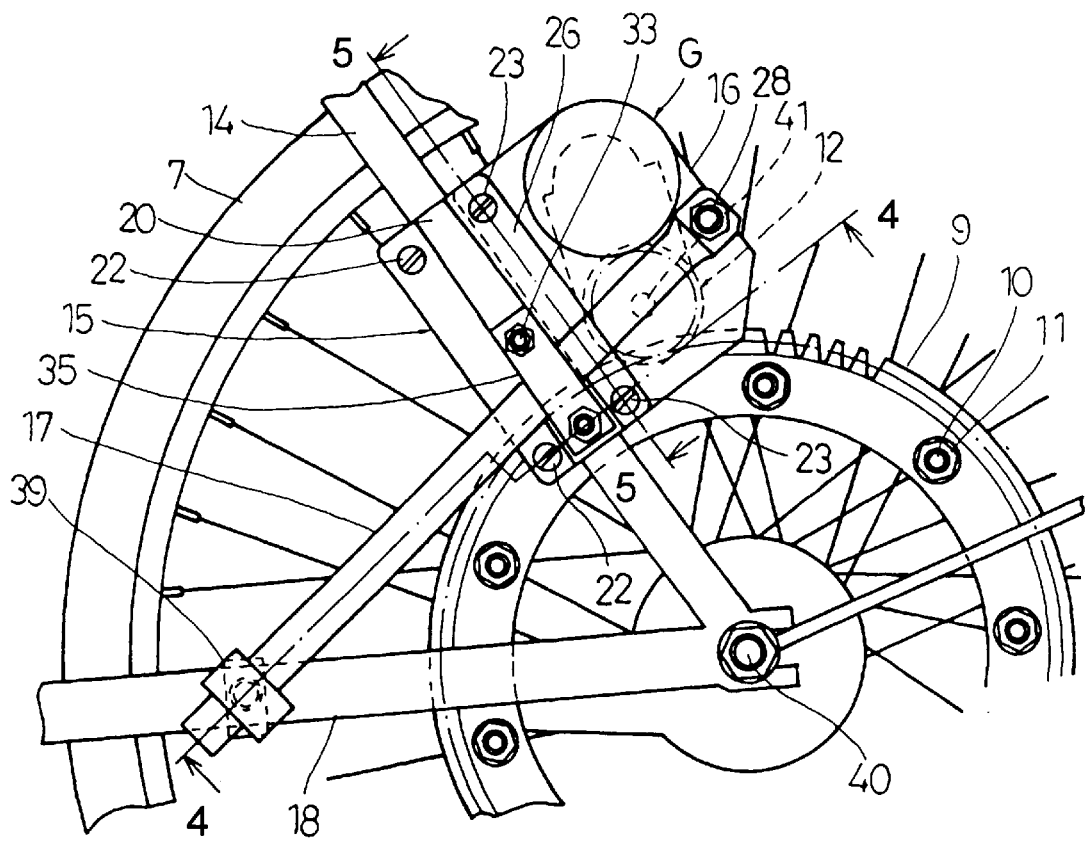
FIG. 3 is an enlarged view of the integral part of FIG. 1.
Figure 4:
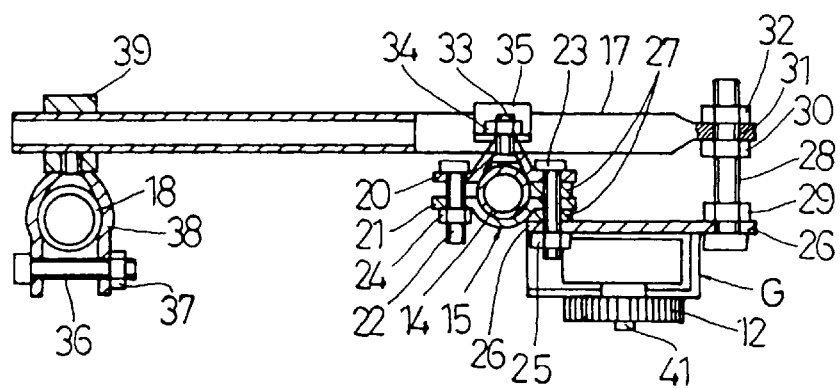
FIG. 4 is a cross-sectional view taken along line I—I in FIG. 3.
Figure 5:
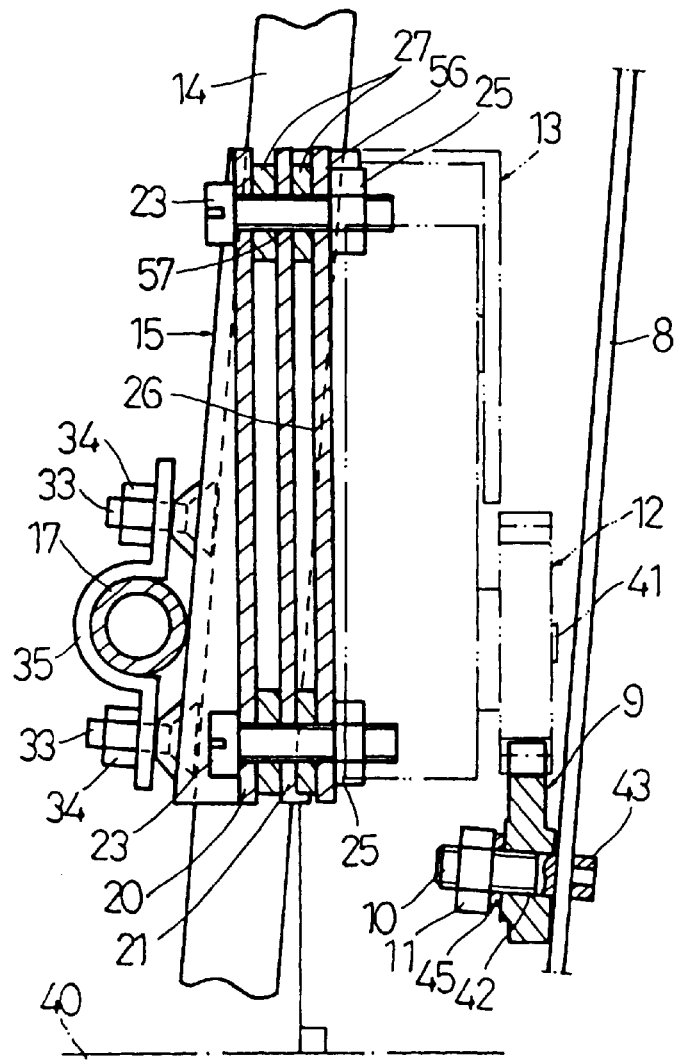
FIG. 5 is an enlarged cross-sectional view taken along line II—II in FIG. 3.

The embodiment shown in FIGS. 3, 4, and 5 illustrates how the driving device G is installed. The attaching member 15 comprises a front attaching member 20 located outside and a rear attaching member 21 located inside. Both members 20 and 21 are fixed so as to sandwich the seat stay 14 using bolts 22, 23 and nuts 24, 25. The driving device G is installed by passing bolts 23 through a plurality of bolt holes 56 formed in the attaching surface 26 of the device G, installing adjustment collars 27, and fixing the device G using a nut 25. The driving device G is disposed inside so as to be protected by each member.

The driving device G is installed by fixing a bracing bolt 28 at an open end 16 of the driving device G in the vertical direction using a nut 29, providing an adjustment nut 30 on the bracing bolt 28, passing the bolt 28 through a bolt hole 31 in the bracing member 17, and fixing the member 17 using a nut 32. The bracing member 17 is also fixed by a fixture 39 comprising a locking member 35 for the bracing member 17 through which a bolt 33 extends vertically from the front of the front attaching member 20 and which is fixed using a nut 34; and a U-shaped fixture 38 bolted on the chain stay 18 using a bolt 36 and a nut 37.

In many bicycles, the seat stay 14 and chain stay 18 extend from the hub axis 40 of the bicycle driving wheel 7 with an angle of 10° maintained between them in plan view. Thus, to install the drive shaft 41 protruding vertically from the driving device G so that it is in parallel with the hub axis 40, that surface of the attaching member to which the driving device G is attached and which has both bolt holes 57 is aligned with a line perpendicular to the hub axis 40. Thus, the conditions required for the transmission means are met by correcting small errors using an adjustment collar 27.

Figure 6A:
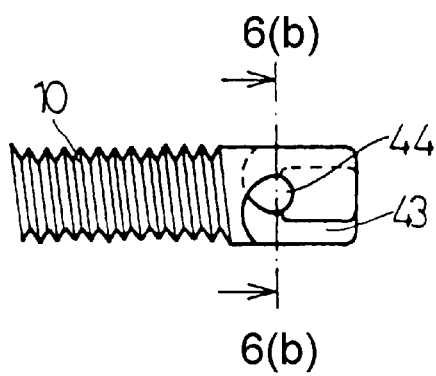
FIG. 6(a) is a side view showing an embodiment of a bolt for spokes.
Figure 6B:
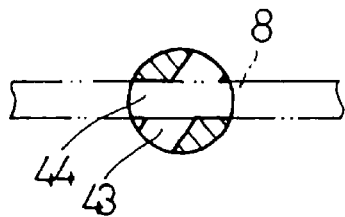
FIG. 6(b) is a cross-sectional view taken along line III—III in FIG. 6(a).

The annular activating wheel 9 is attached to the spokes 8 as shown in the embodiment in FIGS. 5, 6a and 6b. A spoke bolt 10 is passed through a bolt hole 42, a spoke 8 is inserted through an insertion port 43 and guided through a hook hole 44, and a spring seat 45 is installed before a nut 11 is used for fixation.

Figure 7:
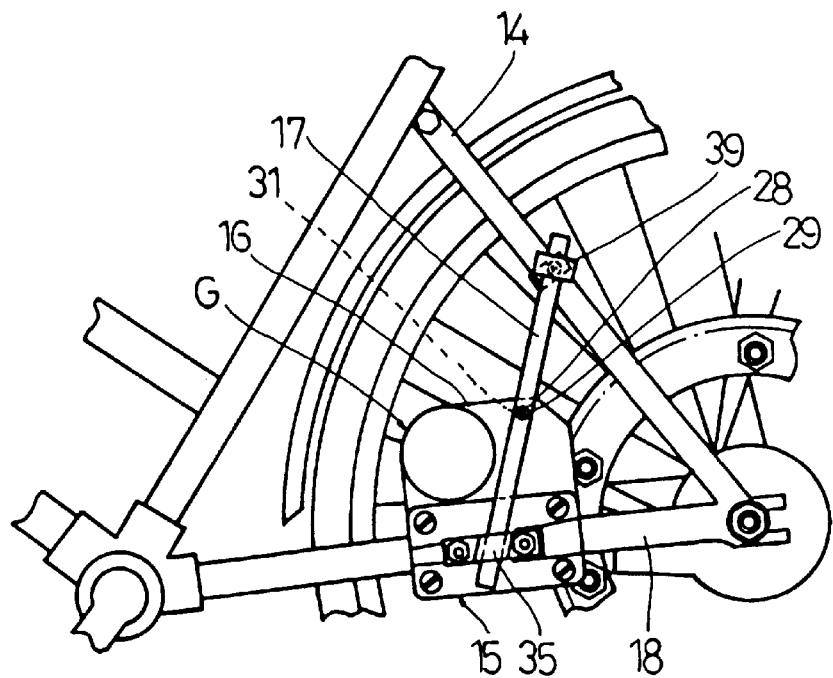
FIG. 7 is a front view of an integral part showing an example of mounting the present apparatus on a bicycle.

FIG. 7 shows an embodiment in which the driving device G is attached to the chain stay 18. The attaching member 15 is fixed to the chain stay 18, the driving device G is attached to the attaching member 15, the bracing member 17 is fixed to the seat and the chain stay 14 and 18 using the locking member 35 and the fixture 39 for the bracing member, and the bracing bolt 28 fixed at the open end 16 of the driving device G is passed through a bolt hole 31 in the middle of the bracing member 17 and fixed using a nut 29.

Figure 8:
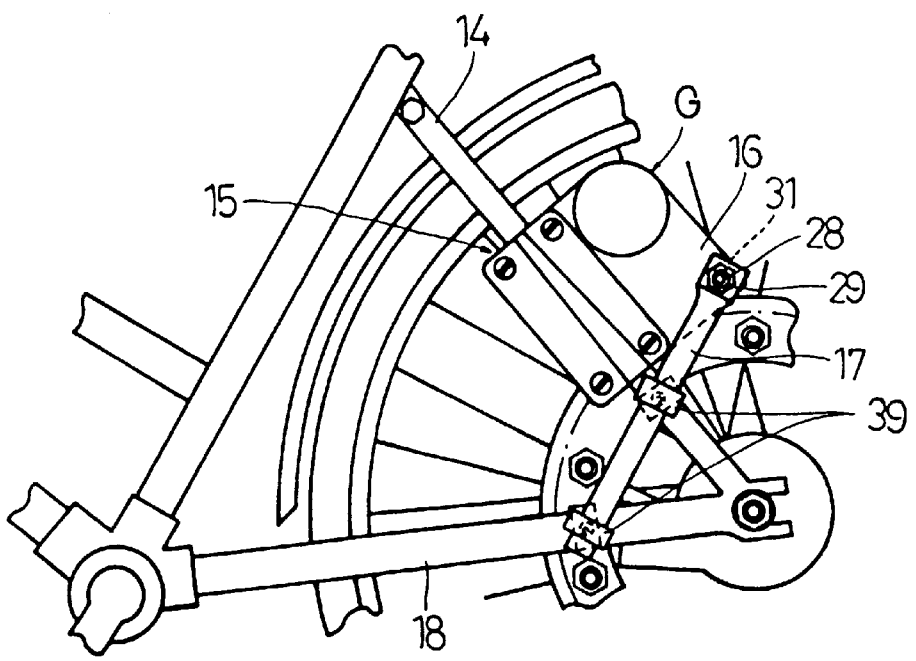
FIG. 8 is a front view of an integral part showing an example of mounting the present apparatus on a bicycle.

FIG. 8 shows an embodiment in which the bracing member 17 is directly secured to the seat stay 14 without the use of the locking member 35. In this case, the attaching member 15 is secured to the seat stay 14 and the driving device G is bolted on. The bracing member 17 is secured to the seat and the chain stays 14 and 18 using the bracing member fixture 39, and the bracing bolt 28 fixed to the open end 16 of the driving device G is passed through the bolt hole 31 in the bracing member and fixed using the nut 29.

Figure 9:
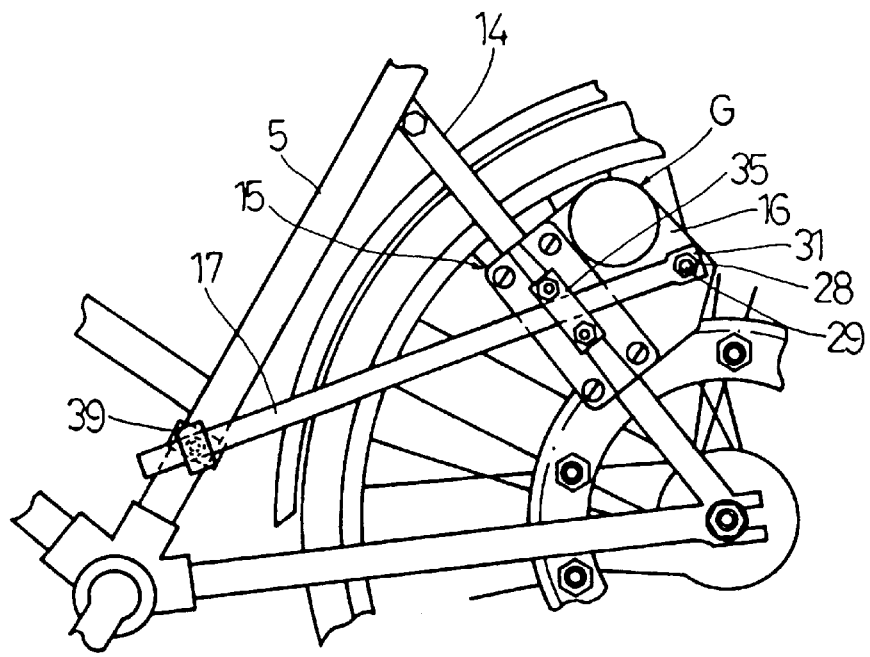
FIG. 9 is a front view of an integral part showing an example of mounting the present apparatus on a bicycle.

FIG. 9 shows an embodiment in which the end of the bracing member 17 is fixed to the seat tube 5. In this case, the attaching member 15 is secured to the seat stay 14 and the driving device G is bolted on. The bracing member 17 is fixed to the underside of the seat tube 5 using the locking member 35 provided on the attaching member 15 and the fixture 39, and the bracing bolt 28 fixed to the open end 16 of the driving device G is passed through another bolt hole 31 and fixed using the nut 29. Thus, the bracing member is secured at three positions including the middle locking member 35.

Figure 10:
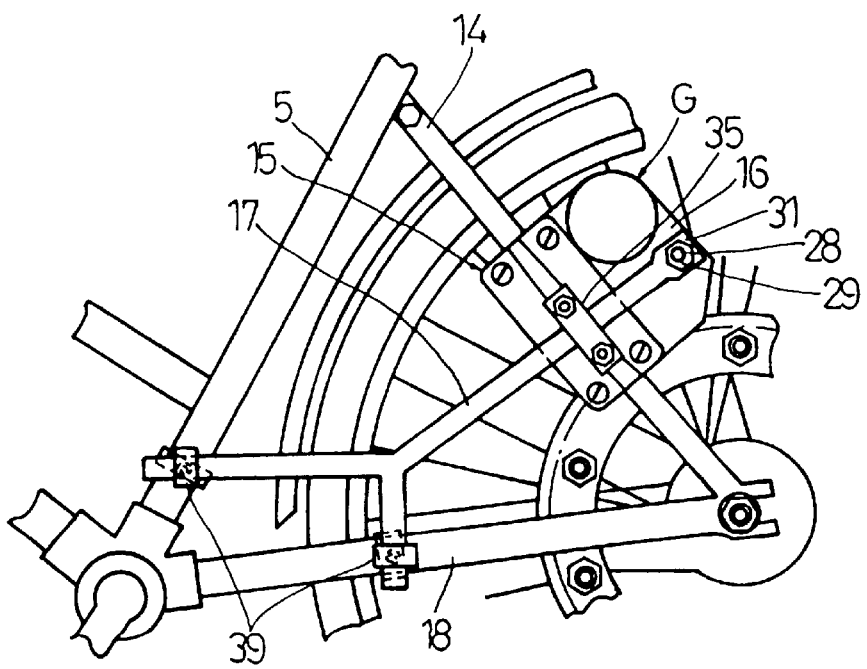
FIG. 10 is a front view of an integral part showing an example of mounting the present apparatus on a bicycle.

FIG. 10 shows an embodiment in which the end of the bracing member 17 is secured to the seat and the chain stays 5 and 18. The bracing member 17 according to this embodiment has a forked end and is secured to both the seat tube 5 and the chain stay 18 using the bracing member fixtures 39.

Figure 11:
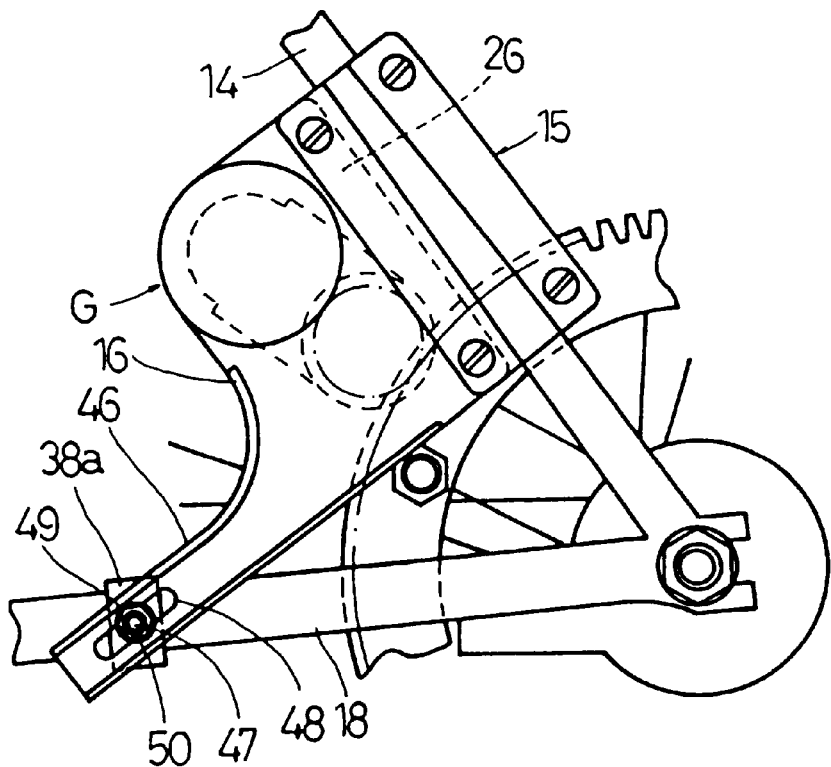
FIG. 11 is a front view of an integral part showing an example of mounting the present apparatus on a bicycle.
Figure 12:
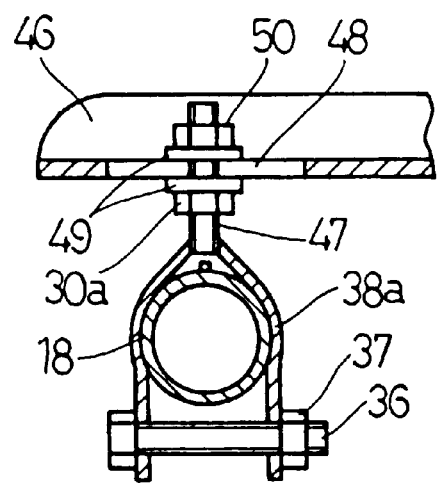
FIG. 12 is a cross-sectional view of a bracing arm in FIG. 11.

FIGS. 11 and 12 show an embodiment in which an arm 46 is formed at the open end 16 of the driving device G as a bracing member and directly fixed to the chain stay 18. The attaching member 15 is secured to the seat stay 14 with the driving device G secured to the attaching member. A fixture 38a having a U-shaped portion is fixed to the chain stay 18 using a bolt 36 and a nut 37, an adjustment nut 30a is provided on a bolt 47 that extends vertically from the fixture 38a, the bolt 47 is passed through a long bolt hole 48 formed in an arm 46 operative as a bracing member, and washers 49 are installed before a nut 50 is used for fixation.

Figure 13:
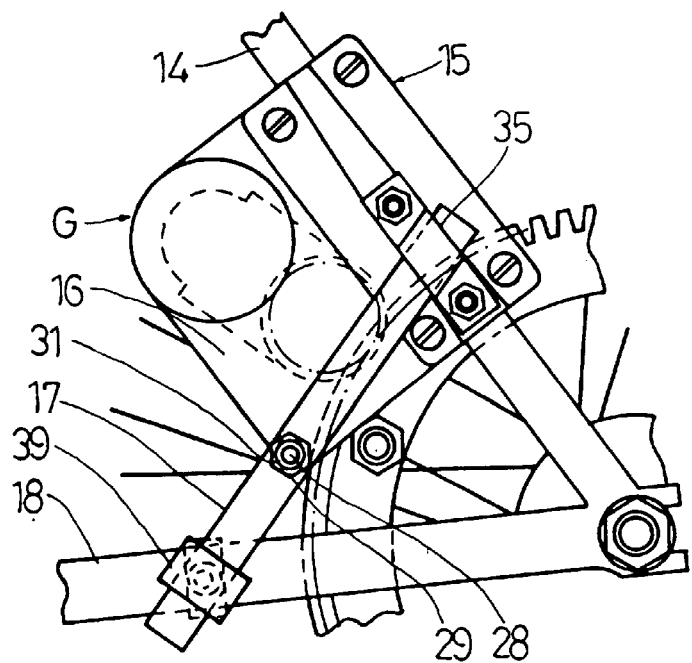
FIG. 13 is a front view of an integral part showing an example of mounting the present apparatus on a bicycle.

FIG. 13 shows an embodiment in which the driving device G is attached to the left underside of the seat stay 14. In this case, the attaching member 15 is secured to the seat stay 14, the driving device G is secured to the left underside of the attaching member, the bracing member 17 is secured to the seat and the chain stays 14 and 18 using the pipe locking member 35 and the fixture 39 for the bracing member, and the bracing bolt 28 fixed to the open end 16 of the driving device G is passed through the bolt hole 31 between the member 35 and the fixture 39 before the nut 29 is used for fixation.

Figure 14:
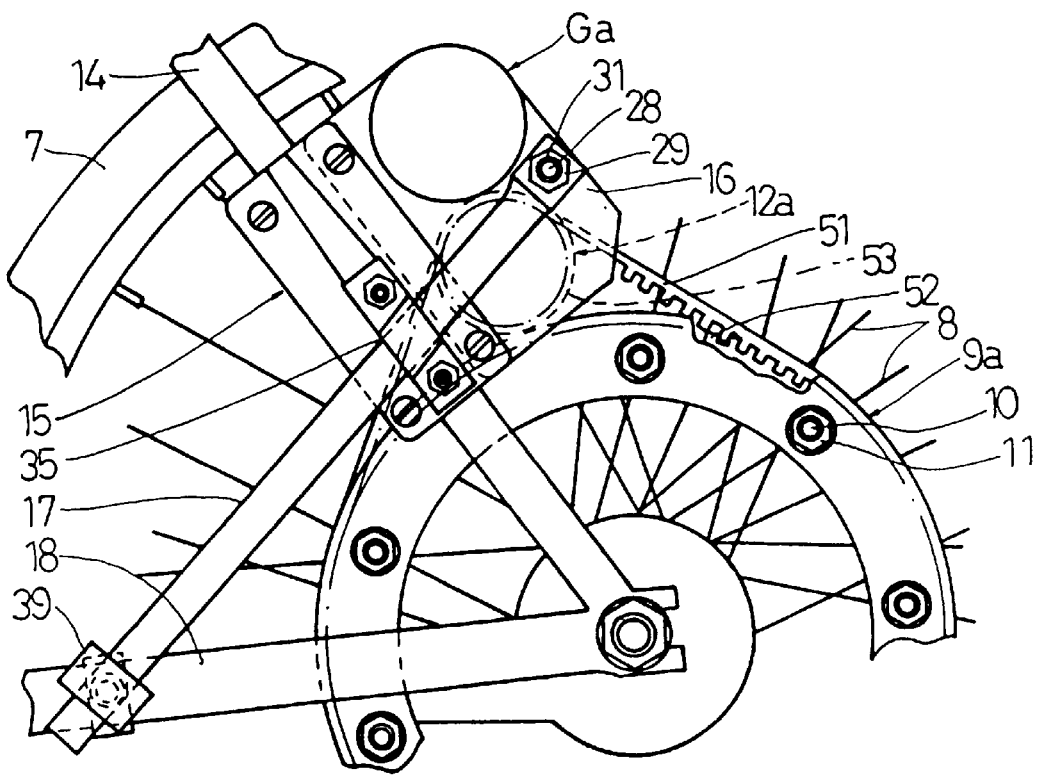
FIG. 14 is a front view of an integral part showing an example of mounting the present apparatus on a bicycle.

FIG. 14 shows an embodiment in which a timing belt 51 is used as a transmission means for a driving wheel 12a and a beam-like activating wheel 9a. The driving wheel 12a is fixed. A driving device Ga is bolted onto the attaching member 15 secured to the seat stay 14, the bracing member 17 is secured onto the seat and the chain stays 14 and 18 using the locking member 35 and the fixture 39 for the bracing member, and the bracing bolt 28 fixed to the open end 16 of the driving device Ga is passed through the bolt hole 31 before the nut 29 is used for fixation.

A belt pulley 52 for transmitting power from the timing belt 51 is provided on the outer circumference of the annular activating wheel 9a attached to the spoke 8 of the bicycle driving wheel 7 using the spoke bolt 10 and nut 11. A timing belt pulley 53 corresponding to the timing belt 51 is mounted on the driving wheel 12a of the driving device G.

Figure 15:
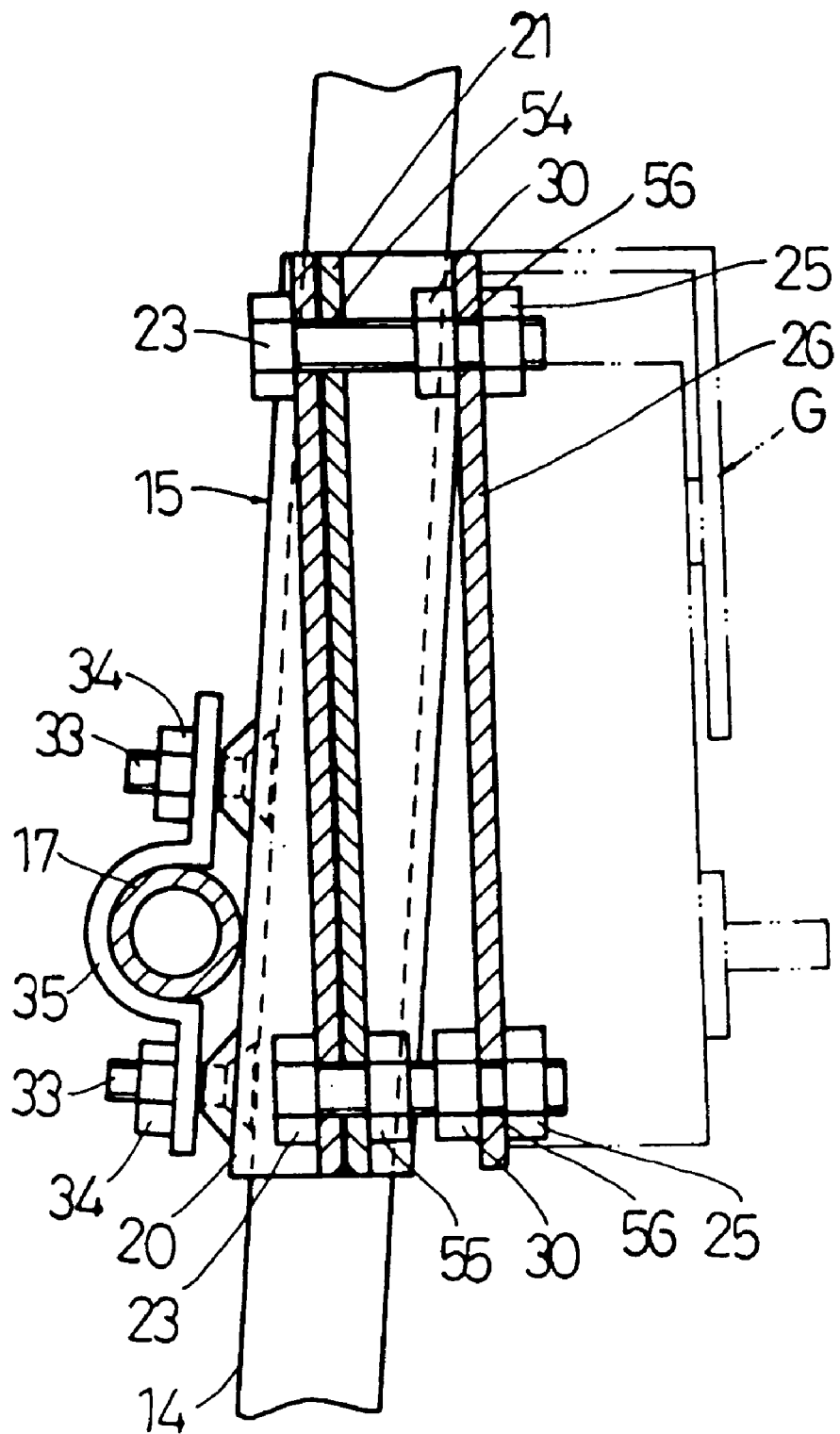
FIG. 15 is a cross-sectional view showing an embodiment of an attaching member.

FIG. 15 shows an embodiment in which the driving device G is bolted via the adjustment nut 30 on the attaching member 15 fixed to the seat stay 14. In this case, the front attaching member 20 and the rear attaching member 21 are fixed to the seat stay 14 by forming a threaded portion 54 on the rear attaching member 21 or using a nut 55 to secure the bolt 23 so that it extends vertically, installing the adjusting nut 30 to the bolt 23, and passing the bolt through a bolt hole 56 formed in the attaching surface 26 for the driving device G before using the nut 25 for fixation. The bracing member 17 is fixed using the locking member 35 installed on the bolt 33 and secured by the nut 34.

Figure 16A:
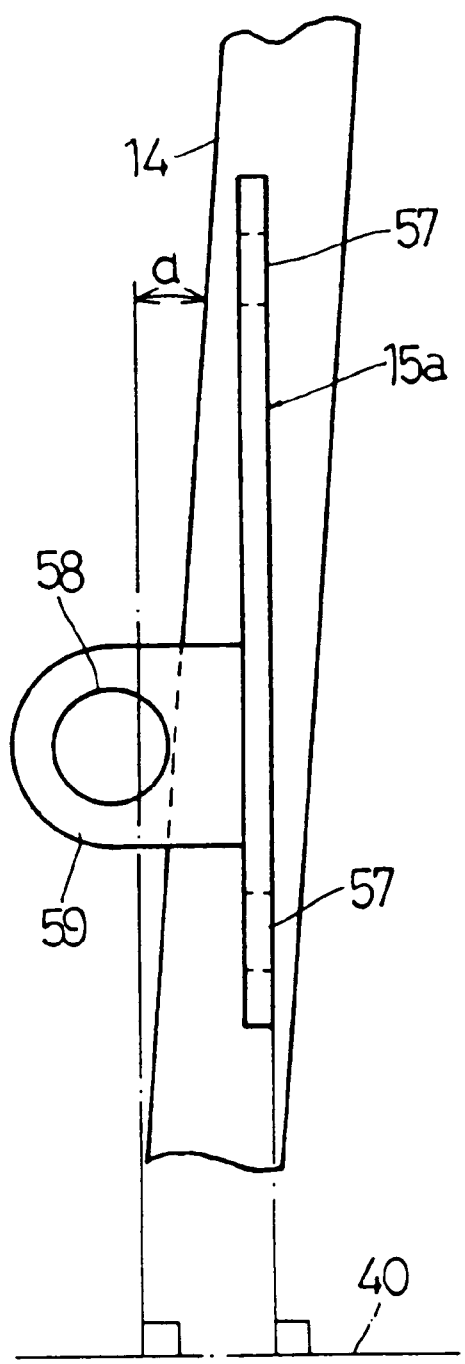
FIG. 16(a) is a side view showing an embodiment of an attachment member.
Figure 16B:
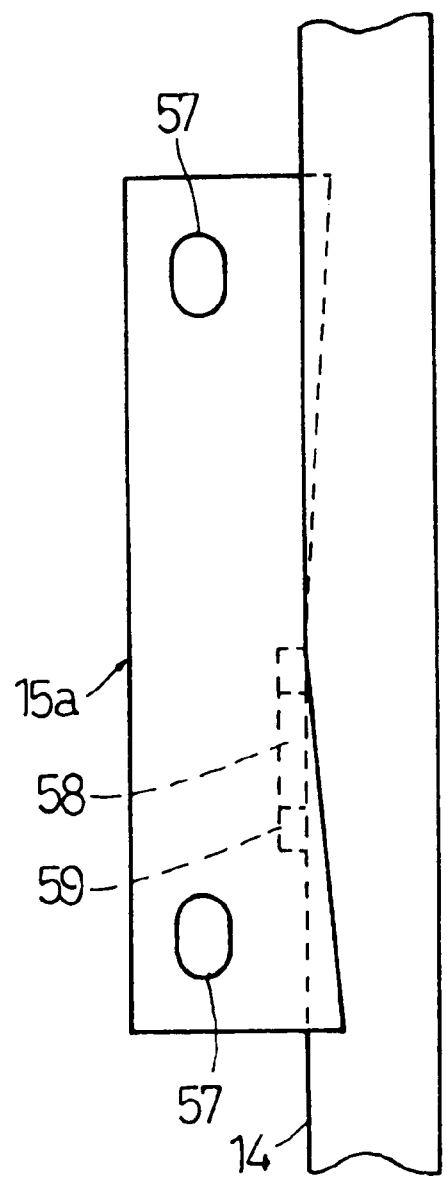
FIG. 16(b) is a rear view of this embodiment.

FIG. 16 shows an embodiment in which the attaching member 15a is welded to the seat or the chain stay 14 or 18. The seat stay 14 is normally inclined at an angle α (about 5°) relative to the hub axis 40 of the bicycle driving wheel. In view of this point, the attaching member 15a with two bolt holes 57 is welded on a line perpendicular to the hub axis 40, and a bracing-member-fixing lug 59 having a pipe-like-member through-hole-58 that is formed between the bolt holes and through which the bracing member 17 is passed and fixed extends vertically from the attaching member 15a.

Figure 17:
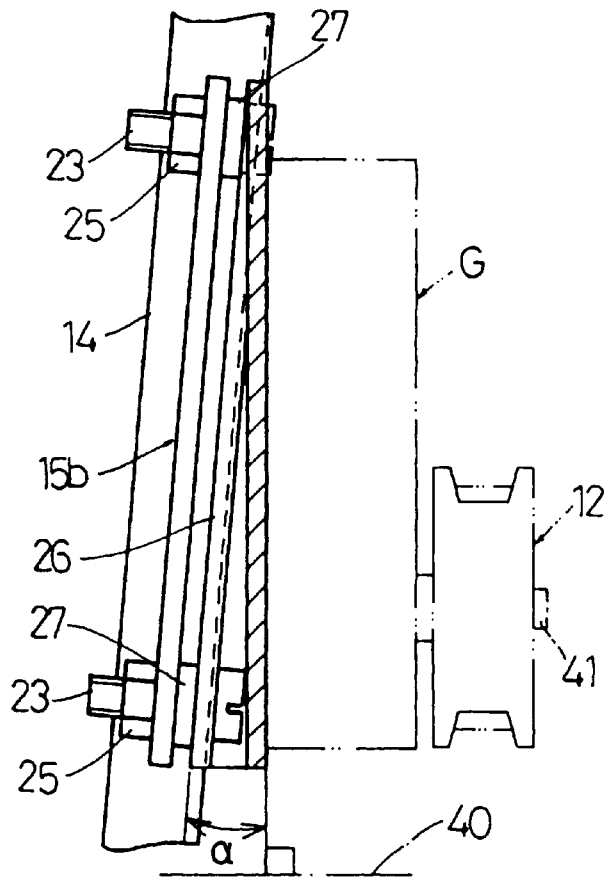
FIG. 17 is a side view showing an embodiment of an attaching plate.
Figure 18:
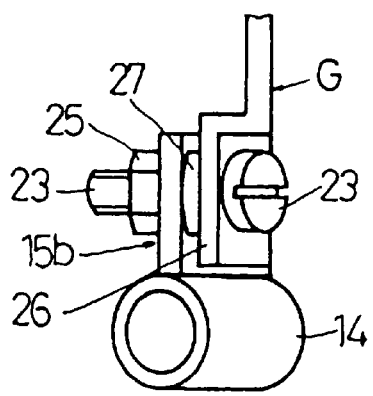
FIG. 18 is a bottom view of FIG. 17.

FIGS. 17 and 18 show an embodiment in which the attaching member 15b is welded to the seat or the chain stay 14 or 18 in such a way that they are in parallel with each other. In this case, that surface 26 of the attaching member to which a driving device G is attached is inclined at angle α, and the adjustment collar 27 is installed on the attaching member 15b, which is then fixed using the bolt 23 and the nut 25 so that the hub axis 40 of the bicycle driving wheel 7 and the drive shaft 41 of the driving wheel 12 are in parallel with each other.

Figure 19:
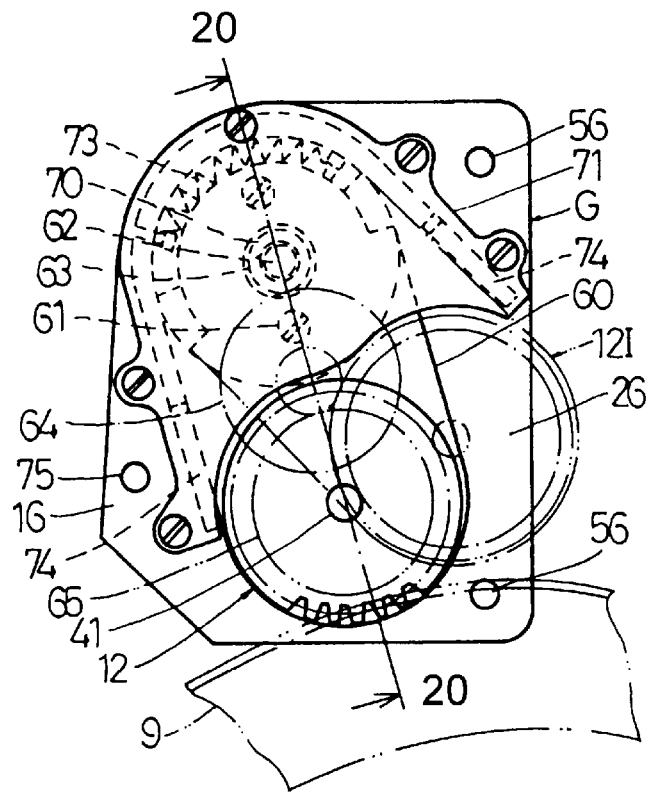
FIG. 19 is a front view showing an embodiment of a driving device.
Figure 20:
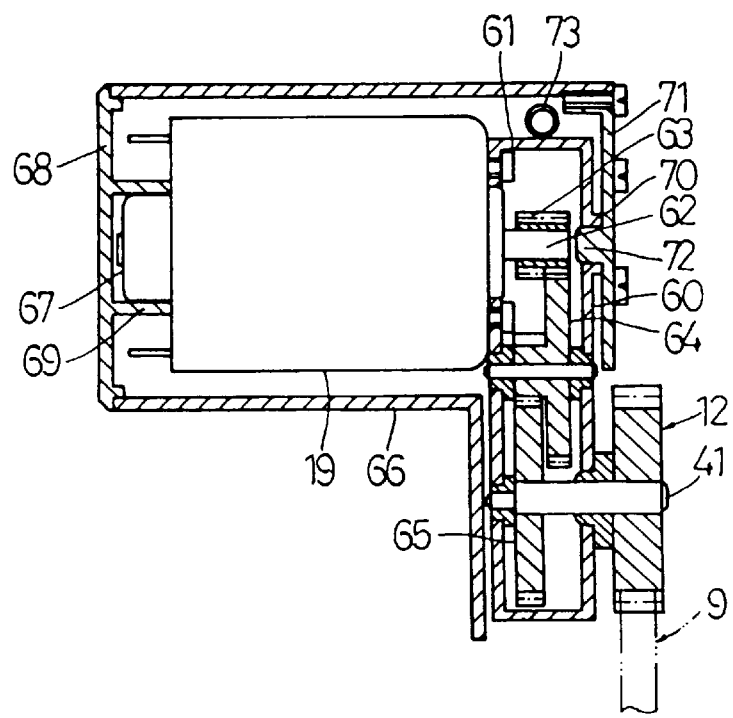
FIG. 20 is a cross-sectional view taken along line IV—IV in FIG. 19.
Figure 21:
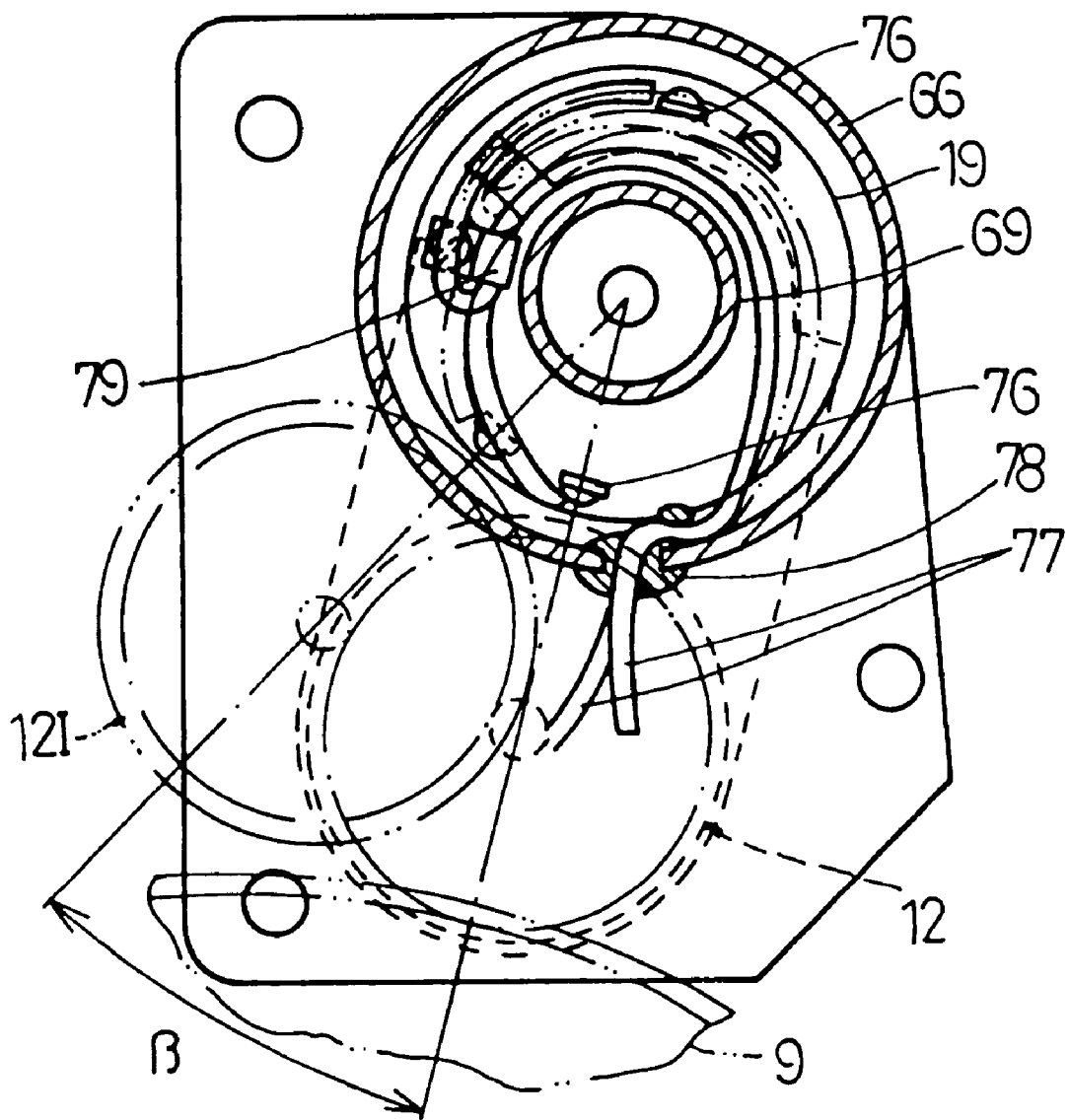
FIG. 21 is a cross-sectional view of FIG. 19 as seen from the rear.

FIGS. 19, 20, and 21 show an embodiment of the driving device G in which the driving wheel 12 is rotated. The motor 19 is fixed to a gear box 60 with a screw 61, a spur gear 65 fastened to a drive shaft 41 via a speed reducing gear 64 is coupled to a pinion 63 fastened to a motor shaft 62, and the driving wheel 12 with a gear corresponding to the annular activating wheel 9 is fastened to the drive shaft 41 allowed to protrude outwardly from the gear box 60. A bottom bearing 67 for the motor 19 in a motor box 66 is supported on a bearing 69 on a bottom plate 68, and bearing 70 is installed on the motor shaft 62 of the gear box 60 to support a supporting shaft 72 of a top cover 71.

An urging means 73 consisting of a tensile coil spring is attached to the gear box 60, the driving wheel 12 is pressed to the right in FIG. 19 into the position of the driving wheel 12I, and a rubber plate is mounted as a buffer material 74 on both sides contacted by the gear box 60. Two bolt holes 56 formed in the attaching surface 26 are used for the attaching member 15, while a bolt hole 75 formed at the open end 16 is used for the bracing member 17.

According to this embodiment, when activated, the motor 19 is rotated through angle β (about 30°) within the motor box 66 to rotate an input terminal 76 thereof, as shown in FIG. 21. Thus, to connect an electric cord 77 to the input terminal 76, the bearing 69 is allowed to make a half turn from a cord guide 78 of the motor box 66 to fix the cord to the motor 19 using a cord fixture 79, and the cord is then connected to the input terminal 76.

Figure 22:
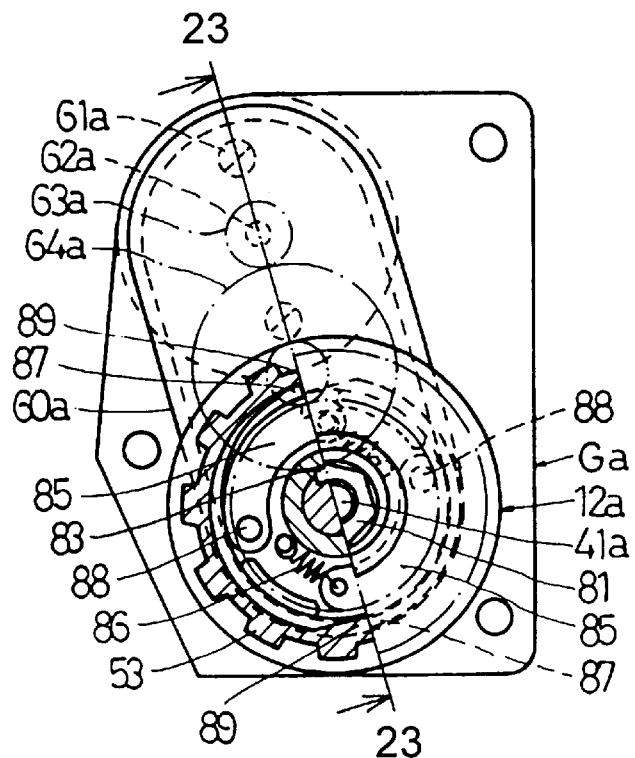
FIG. 22 is a partially cross-sectional front view showing an embodiment of a driving device.
Figure 23:
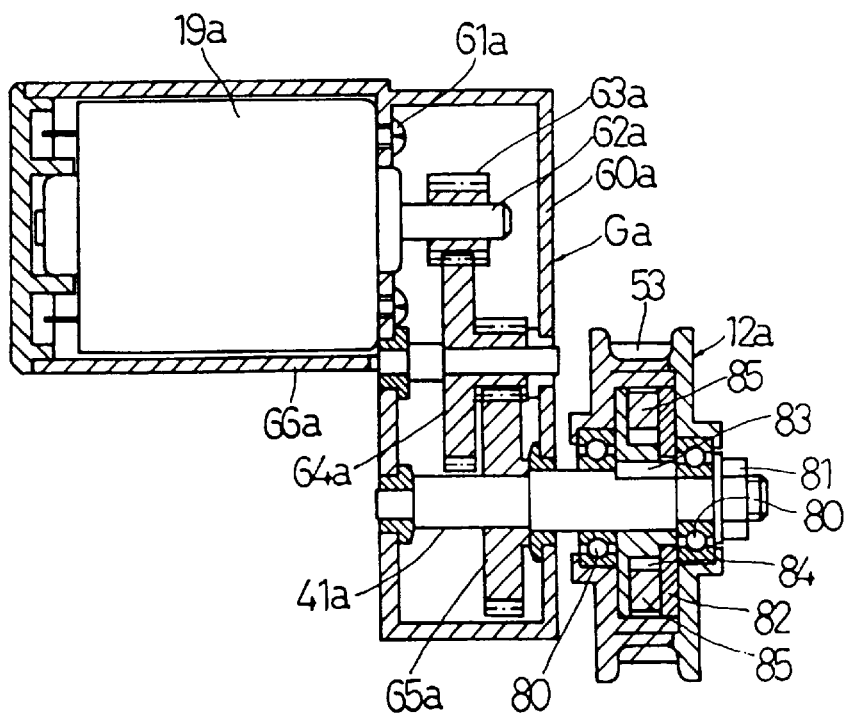
FIG. 23 is a cross-sectional view taken along line V—V in FIG. 22.

FIGS. 22 and 23 show an embodiment of the driving device Ga including the fixed driving wheel 12a and the timing belt pulley 53 installed on its outer circumference. A motor box 66a is integrated with a gear box 60a. A motor 19a is secured within the motor box 66a using a screw 61a, and a spur gear 65a fastened to a drive shaft 41a via a speed reducing gear 64a is coupled to a pinion 63a fastened to a motor shaft 62a.

The timing belt pulley 53 that runs idly using a ball bearing 80 is attached to the drive shaft 41a allowed to protrude outwardly from the gear box 60a, a rotating disc 82 is secured to the drive shaft 41a using a key 83, and a centrifugal click 85 is journaled to a shaft 88 in a groove 84 formed in the rotating disc 82 in such a way that a claw 87 of the click is pulled inward by a tensile coil spring 86. Inner teeth 89 on which the claw 87 is caught are formed on the inner circumference of the timing belt pulley 53. The driving device Ga is used for the embodiment in FIG. 14.

According to this invention, the front or the rear attaching member 20 or 21 may be formed to directly extend from the attaching surface for the driving device G, Ga.

Since this invention is configured and operated as described above, the open end of the driving device G, Ga fixed to the attaching member can be bolted to the bracing member to lock the driving device at three circumferential positions. In addition, since the body with the driving device G attached thereto constitutes a rigid portion, it can be firmly installed to prevent each section from being deformed or vibrated, thereby enabling power to be transmitted without losses and supplementing the manual power employed to allow existing bicycles to travel very comfortably and smoothly.

In addition, since the locking member 35 is provided on the front surface of the front attaching member 20, the bracing member can be fixed easily by simply tightening the nut provided on the front surface, and the length of the bracing hole into which the bolt is inserted can be adjusted easily.

When the bracing member 17 is secured to the bracing bolt of the driving device, the adjustment nut 30 can be provided to easily adjust the interval between the member 17 and the device by rotating the nut, thereby allowing the driving wheel to be aligned with the annular activating wheel regardless of the shape of the bicycle's frame.

Similar effects can be obtained by providing adjustment nuts on the bolts fixed to the attaching members 15, 15a, and 15b before fixing the driving device. By setting that surface of the attaching member which has bolt holes for the driving device on a line perpendicular to the hub axis, the drive shaft of the driving device can be installed easily in parallel with the hub axis of the bicycle driving wheel.

In addition, if that surface of the attaching member 15, 15a, or 15b which has bolt holes is not set on a line perpendicular to the hub axis, similar effects can be obtained by inclining at angle a that surface of the attaching member to which the driving device G is attached.

In the driving device G with the rotatable drive shaft 41, when the driving device is out of use, the driving wheel 12 is disengaged from the annular activating wheel 9 with no resistance present between them, allowing the bicycle to be operated manually. Since the motor 19 is supported on the bearing, when the motor 19 is rotationally moved, frictional resistance caused by the rotation of the motor does not increase because the force effected on the bearing during operation is not applied to the rotating motor shaft.

In the driving device Ga with the fixed drive shaft 41a, when the driving wheel is attached to the drive shaft, a mechanism such as a centrifugal clutch allows the driving wheel to run idly to cause little resistance even if the bicycle travels while the drive shaft is stopped. In addition, when the bicycle is driven backwards, the driving wheel also runs idly to prevent the rear wheel from locking.

Furthermore, a non-stage transmission switch can be provided as a driving switch to eliminate the need for force when walking the bicycle up sloped surfaces (such as overpasses).

What is claimed is:

1. In a bicycle having at least one steering wheel and a bicycle driving wheel driven by pedals, an apparatus for supplying the bicycle driving wheel with auxiliary power to reduce driving force, comprising: an annular activating wheel concentrically attached to a spoke portion that couples a hub and a rim of a bicycle driving wheel, a driving device formed of a motor operative as a source of power and a transmission means for transmitting power to the annular activating wheel, an attaching member securing the driving device to one of a seat stay and a chain stay such that the driving device is mounted on only one side of the bicycle driving wheel, and a bracing member attached to the seat stay, an outer surface of the attaching member, and at least one of the chain stay and a seat tube.

2. The auxiliary power supply apparatus according to claim 1 wherein said transmission means comprises a timing belt and a belt pully on an outer circumference of the annular activating wheel and wherein the driving device includes a driving wheel corresponding to said transmission means and rotated by said motor and a speed-reducing device, with an open end of the driving device attached to said bracing member.

3. The auxiliary power supply apparatus according to claim 1 further comprising a locking member for fixing the bracing member to the outer surface of the attaching member.

4. The auxiliary power supply apparatus according to claim 1 wherein a bracing bolt is passed through the driving device and the bracing member, an adjustment nut is provided between them, and a nut is used for fixation, in order to secure the bracing member on an open end of the driving device, which has a bolt hole.

5. The auxiliary power supply apparatus according to claim 1 wherein when the attaching member is installed on one of the seat stay and the chain stay, a surface of the attaching member, which has bolt holes to allow the driving device to be bolted thereto, is aligned on a line perpendicular to a hub axis of the bicycle driving wheel.

6. The auxiliary power supply apparatus according to claim 1 wherein a bolt is fixed to the attaching member installed on one of the seat stay and the chain stay so that the bolt extends vertically, and wherein an adjustment nut is provided on the bolt, which is then passed through a bolt hole formed on that surface of the attaching member to which the driving device is attached and which is then fixed using a nut.

7. The auxiliary power supply apparatus for bicycles according to claim 1 wherein an attaching surface for the driving device is inclined at an angle so that a drive shaft is parallel with a hub axis, in order to secure the driving device onto the attaching member, that surface of the attaching member having bolt holes through which the driving device is attached being inclined at an angle relative to a line perpendicular to the hub axis.

8. The auxiliary power supply apparatus for bicycles according to claim 1 wherein the driving device has an attaching surface side and an open-end side, wherein the driving device can be secured to the attaching member at two positions on its attaching surface side and to the bracing member at one position on its open-end side.

9. The auxiliary power supply apparatus for bicycles according to claim 1 wherein the bracing member for the driving device is embodied as a bracing arm formed on an open end side of the driving device, said bracing arm having a long hole through which a bolt can be passed.

10. The auxiliary power supply apparatus for bicycles according to claim 1 wherein a drive shaft of the driving device is parallel to a hub axis.

11. The auxiliary power supply apparatus for bicycles according to claim 1 wherein the motor is fixed to a gear box, wherein a spur gear fixed to a drive shaft is coupled via a speed reducing gear to a pinion fixed to a motor shaft, wherein a driving wheel is attached to the drive shaft disposed external to the gear box, and wherein the motor and the gear box are supported in a motor box using a bottom bearing, a bearing, a bearing of a bottom cover, and a supporting shaft of a top cover so as to enable the driving wheel to be rotated.

12. The auxiliary power supply apparatus for bicycles according to claim 1 wherein a motor and a gear box are integrated together, wherein a motor is placed in a motor box and fixed to the gear box, wherein a spur gear fixed to a drive shaft via a speed reducing gear is coupled to a pinion fixed to a motor shaft in the gear box, wherein a driving wheel is rotatably attached via a ball bearing to the drive shaft disposed external to the gear box, and wherein the apparatus incorporates a mechanism transmitting rotation of the drive shaft for a centrifugal clutch to the driving wheel only when the drive shaft is rotated.

13. The auxiliary power supply apparatus according to claim 1 wherein said transmission means comprises a gear on an outer circumference of the annular activating wheel and wherein the driving device includes a driving wheel corresponding to said transmission means and rotated by said motor and a speed-reducing gear.

14. The auxiliary power supply apparatus for bicycles according to claim 1 wherein the motor is fixed to a gear box in which a speed-reducing gear converts rotation of a motor shaft to rotation of a drive shaft, the drive shaft turning a driving wheel which in turn provides rotational energy to the annular activating wheel.

15. The auxiliary power supply apparatus for bicycles according to claim 1 wherein a motor and a gear box are integrated together and in which a speed-reducing gear converts rotation of a motor shaft to rotation of a drive shaft, a driving wheel rotatably attached via a ball bearing to the drive shaft, rotation of the drive shaft activating a centrifugal clutch mechanism to engage the driving wheel which in turn provides rotational energy to the annular activating wheel, the clutch operating such that when the drive shaft is stationary, the driving wheel rotates freely of the driving device.

16. In a bicycle having at least one steering wheel and a bicycle driving wheel, an apparatus for supplying the bicycle driving wheel with auxiliary power to reduce driving force, comprising an annular activating wheel concentrically attached to a spoke portion that couples a hub and a rim of the bicycle driving wheel, a driving device formed of a motor operative as a source of power and a transmission means for transmitting power to the annular activating wheel, an attaching member securing the driving device to one of a seat stay and a chain stay such that the driving device is mounted on only one side of the bicycle driving wheel, and a bracing member attached to the attaching member and to a body-constituting member of the bicycle.

17. The auxiliary power supply apparatus for bicycles as set forth in claim 16 wherein the driving device has an attaching surface side and an open-end side, wherein the driving device is secured to the attaching member at two positions on its attaching surface side and to the bracing member at one position on its open-end side.

* * * * *